United States Patent
Bolaños-Chaverri et al.

(10) Patent No.: US 10,539,322 B2
(45) Date of Patent: Jan. 21, 2020

(54) METHOD FOR COMBUSTING A FUEL, AND COMBUSTION DEVICE

(71) Applicant: ANSALDO ENERGIA SWITZERLAND AG, Baden (CH)

(72) Inventors: Felipe Bolaños-Chaverri, Baden (CH); Torsten Wind, Hallwil (CH); Fernando Biagioli, Fislisbach (CH); Khawar Syed, Oberrohrdorf (CH)

(73) Assignee: Ansaldo Energia Switzerland AG, Baden (CH)

( * ) Notice: Subject to any disclaimer, the term of this patent is extended or adjusted under 35 U.S.C. 154(b) by 224 days.

(21) Appl. No.: 15/481,743

(22) Filed: Apr. 7, 2017

(65) Prior Publication Data

US 2017/0292695 A1    Oct. 12, 2017

(30) Foreign Application Priority Data

Apr. 8, 2016 (EP) .................................. 16164572

(51) Int. Cl.
*F23R 3/34* (2006.01)
*F23C 7/00* (2006.01)
(Continued)

(52) U.S. Cl.
CPC ............... *F23C 7/00* (2013.01); *F23R 3/005* (2013.01); *F23R 3/286* (2013.01); *F23R 3/34* (2013.01);
(Continued)

(58) Field of Classification Search
CPC .. F23C 7/00; F23C 2900/07002; F23R 3/005; F23R 3/14; F23R 3/18; F23R 3/286;
(Continued)

(56) References Cited

U.S. PATENT DOCUMENTS 4,052,144 A    10/1977  Marek
4,112,676 A *   9/1978  DeCorso ................. F23R 3/007
                                                    431/10
(Continued)

FOREIGN PATENT DOCUMENTS

EP    0 321 809 A1    6/1989
EP    0 780 629 A2    6/1997
(Continued)

OTHER PUBLICATIONS

Search Report dated Oct. 12, 2016, by the European Patent Office for International Application No. 16164572.6.

*Primary Examiner* — Steven M Sutherland
(74) *Attorney, Agent, or Firm* — Buchanan Ingersoll & Rooney PC

(57) ABSTRACT

A method for determining fatigue lifetime consumption of an engine component, by defining a reference thermal load cycle, the reference thermal load cycle being characterized by a reference load cycle amplitude and a reference load cycle time, and determining a reference load cycle lifetime consumption. The method includes measuring a temperature of the engine component, determining a thermal load cycle based upon the temperature measurement, determining a load cycle amplitude, determining a load cycle time, relating the load cycle time to the reference load cycle time, thereby determining a load cycle time factor, relating the load cycle amplitude to the reference load cycle amplitude, thereby determining a load cycle amplitude factor, combining the load cycle time factor and the load cycle amplitude factor into a combined load cycle factor for determining a load cycle lifetime consumption.

19 Claims, 3 Drawing Sheets

(51) Int. Cl.
  *F23R 3/00*    (2006.01)
  *F23R 3/28*    (2006.01)
  *F23D 17/00*   (2006.01)

(52) U.S. Cl.
  CPC .... *F23R 3/346* (2013.01); *F23C 2900/07002* (2013.01); *F23D 17/002* (2013.01); *F23R 3/28* (2013.01)

(58) Field of Classification Search
  CPC .... F23R 3/346; F23R 3/34; F23R 3/28; F23R 2900/03341; F23L 2900/15042
  See application file for complete search history.

(56)             References Cited

U.S. PATENT DOCUMENTS

| | | | |
|---|---|---|---|
| 4,173,118 A * | 11/1979 | Kawaguchi | F23C 3/00 |
| | | | 431/352 |
| 4,845,940 A * | 7/1989 | Beer | F23C 6/045 |
| | | | 60/732 |
| 4,932,861 A | 6/1990 | Keller et al. | |
| 5,307,634 A | 5/1994 | Hu | |
| 5,402,633 A | 4/1995 | Hu | |
| 5,735,687 A | 4/1998 | Knöpfel et al. | |
| 6,178,752 B1 | 1/2001 | Morford | |
| 6,201,029 B1 * | 3/2001 | Waycuilis | C01B 3/382 |
| | | | 252/373 |
| 2004/0083737 A1 * | 5/2004 | Wright | F23R 3/005 |
| | | | 60/773 |
| 2004/0219079 A1 | 11/2004 | Hagen et al. | |
| 2004/0238654 A1 | 12/2004 | Hagen et al. | |
| 2006/0005542 A1 * | 1/2006 | Campbell | F02C 6/00 |
| | | | 60/723 |
| 2006/0174625 A1 * | 8/2006 | Ohri | F23R 3/14 |
| | | | 60/737 |
| 2008/0083224 A1 * | 4/2008 | Varatharajan | F23R 3/14 |
| | | | 60/748 |
| 2009/0071166 A1 | 3/2009 | Hagen et al. | |
| 2009/0180939 A1 | 7/2009 | Hagen et al. | |
| 2014/0165577 A1 | 6/2014 | Melton et al. | |

FOREIGN PATENT DOCUMENTS

| | | |
|---|---|---|
| EP | 0 945 677 A2 | 9/1999 |
| WO | WO 93/17279 A1 | 9/1993 |
| WO | WO 2011/154281 A1 | 12/2011 |

* cited by examiner

METHOD FOR COMBUSTING A FUEL, AND COMBUSTION DEVICE

PRIORITY CLAIM

This application claims priority from European Patent Application No. 16164572.6 filed on Apr. 8, 2016, the disclosure of which is incorporated by reference.

TECHNICAL FIELD

The present disclosure relates to a method for combusting a fuel as disclosed in claim 1, and to a combustion device particularly suitable far carrying out the method.

BACKGROUND OF THE DISCLOSURE

Combustion in combustion chambers of gas turbine engines and in other industrial appliances needs to be performed over a large load range and at the same time with a minimum of pollutant emissions.

In gas turbine engines, frequently lean premix burners are applied, as for instance are known from, while not limited to those disclosed in, EP 321 809, EP 780 629, WO93/17279 or EP 945 677. However, individual burners of said type have only a quite limited range of loads, of burner equivalence ratios, respectively, in which they may be safely operated. With lower equivalence ratios at low load operation thermoacoustic oscillations may appear, or the flame may even completely extinguish. These lean premix type burners thus yield a very limited turndown ratio for part load operation. One possible approach to this extent may be the application of so-called pitot stages in the burners. The pilot stages are operated with diffusion combustion, having, due to the stoichiometry gradients inherent in diffusion combustion, a superior flame stability even at very low overall equivalence ratios. On the other hand, in diffusion combustion a zone of stoichiometric combustion is generally present, resulting in high peak temperatures and accordingly a high generation of thermally induced nitric oxides.

It is also known to apply so-called Constant Pressure Sequential Combustion CPSC. CPSC applies a front combustion stage at an understoichiometric equivalence ratio. Further fuel is injected into and combusted in the generated flow of still oxygen-rich combustion products. Generally, the front combustion stage requires the addition of mixer air in order to reduce the thermally induced formation of nitric oxides. The addition of mixer air, however, adds cost and bears the potential of inducing thermoacoustic oscillations.

LINEOUT OF THE SUBJECT MATTER OF THE PRESENT DISCLOSURE

It is an object of the present disclosure to provide a method of combusting a fuel. Further, a respective combustion device particularly suitable to carry out the proposed method shall be disclosed. In one aspect, a method and a related combustion device shall be disclosed which allows stable combustion without a heavy formation of thermally induced nitric oxides. In another aspect, the issue of releasing incomplete combustion products, such as carbon monoxide and unburnt hydrocarbons, shall be addressed which is commonly related to part load operation with an insufficient retention time at suitably high temperatures. It is a common problem in combusting a fuel to provide a sufficient retention time of the combustibles at sufficiently high temperatures to completely oxidize all combustible components. On the other hand, if said temperatures and retention times are too high this may cause a heavy formation of thermally induced nitric oxides. In particular if a certain load range is to be covered, this issue must be solved over the entire load range. In another aspect the need for an addition of mixer air in CSPC shall be significantly reduced if not eliminated. The method and the combustion device shall, according to another aspect, allow for a good turndown ratio, that is, a superior combustion performance in view of complete combustion, low nitric oxides formation, and a reliable, stable combustion with a low potential to generate thermoacoustic oscillations. In still another aspect, the method and the device shall allow for a fast downstream homogenization of temperature non-uniformities.

This is achieved by the subject matter described in claim 1 and in the further independent claim.

Further effects and advantages of the disclosed subject matter, whether explicitly mentioned or not, will become apparent in view of the disclosure provided below.

Accordingly disclosed is a method for combusting a fuel, the method comprising providing a first oxidizer mass flow, providing a second oxidizer mass flow and discharging a fuel mass flow into the first oxidizer mass flow, thereby providing a fuel/oxidizer mass flow. The oxidizer may for one instance most commonly be air or a still oxygen rich flue gas, but may likewise be pure oxygen, oxygen enriched air, or a mixture of one or more of the aforementioned, and may in a most general sense be any fluid comprising oxygen, or another agent suitable to react with the fuel in an exothermal reaction. While most commonly the first and second oxidizer mass flows may consist of identical fluids, it may be conceivable to provide different fluids in the first and second oxidizer mass flow. In an application in a gas turbine engine, for one instance, the oxidizer mass flows may be partial mass flows of a total mass flow provided by a compressor. The method comprises apportioning the fuel mass flow such as to achieve an overstoichiometric ratio of the fuel mass flow related to the first oxidant mass flow, and initiating a combustion of the fuel mass flow with the first oxidizer mass flow under the said fuel rich conditions, thereby generating a flow of combustion products, wherein the flow of combustion products comprises residual combustable components.

A combustion with an overstoichiometric fuel/oxidizer ratio will be readily understood as combusting a rich combined fuel/oxidizer mass flow, in which the amount of oxidizing agent, for instance, in the case of air being provided as the oxidizer, oxygen, is insufficient to completely burn the amount of fuel provided. Thus, even upon complete consumption of the oxidizing agent, residual combustible components will remain. Said residual combustible components comprise at least one of non-combusted and/or partially combusted fuel components. Said residual combustible components may, in the case of burning hydrocarbon fuels, for instance comprise, but not necessarily be limited to, carbon monoxide CO, unburned or incompletely burned hydrocarbons UHC, hydrocarbon radicals and so forth. Due to the lack of oxidizing agent, and further due to the reduced temperature when compared to a stoichiometric combustion, the thermally induced formation of nitric oxides is limited to a minimum, even in the presence of nitrogen from air. On the other hand, a rich flame exhibits outstanding combustion stability even at comparatively low combustion temperatures. Thus, a reliable combustion with low nitric oxide generation is achieved in combusting the fuel mass flow in the first oxidizer mass flow at overstoichiometric conditions. Stable combustion is also achieved with a premixed rich fuel/oxidizer mixture over a large band of stoichiometry ratios, but is necessarily tied to incomplete combustion. In contrast, a combustion with an understoichiometric fuel/oxidizer ratio or lean combustion will be understood as a combustion with a surplus of oxidizing agent, that is, even upon complete combustion of the fuel residual oxidizing agent will remain in the resulting combustion products. Overall understoichiometric combustion bears the potential for complete combustion, but premix combustion inhibits an inherent combustion instability and incomplete combustion if certain prerequisites are not met, that is, in particular if the premix combustion temperature is below a certain threshold level. Lean premix combustion thus performs excellently in a specific stoichiometry window, but combustion performance degrades rapidly outside said window. Combustion under lean overall conditions may be achieved with superior combustion stability in a diffusion combustion mode, where a gradient of local fuel/oxidizer ratios, and consequently of local combustion temperatures, is present. Due to high local temperatures, combustion in a diffusion flame mode with a surplus of oxidizing agent is generally tied to high generation of thermally induced nitric oxides.

The herein disclosed method further comprises providing the flow of combustion products to at least one first duct of a heat exchange appliance and providing the second oxidizer mass flow to at least one second duct of the heat exchange appliance, whereby the flow of combustion products is provided in a heat exchange relationship with the second oxidizer mass flow through the heat exchange appliance. Heat is thus exchanged between the flow of combustion products and the second oxidizer mass flow, thereby heating the second oxidizer mass flow and cooling the flow of combustion products. It is noted that the flow of combustion products and the second oxidizer mass flow are in particular in a mere heat exchange relationship in the heat exchange device while being physically separated from each other. The flow of combustion products and the second oxidizer mass flow do not intermix in the heat exchange device, and the heat exchange device may provide two completely separated flow paths for the fuel/oxidizer mass flow and the second oxidizer mass flow. Subsequently, the flow of combustion products is discharged from the first duct of the heat exchange appliance at a downstream end of the heat exchange appliance, the second oxidizer mass flow is discharged from the second duct of the heat exchange appliance at a downstream end of the heat exchange appliance, and the residual combustible components provided in the flow of combustion products are combusted in the presence of the second oxidizer mass flow.

Due to the fact that heat is exchanged between the flow of combustion products and the second oxidizer mass flow, the total heat release of complete combustion of the fuel mass flow is dispersed to a larger total mass flow. A fraction of the heat form incompletely combusting the fuel mass flow in the first oxidizer mass flow is transferred to the second oxidizer mass flow. In turn, when performing the final combustion of the fuel, or the combustible residuals thereof, respectively, with the second oxidizer mass flow, the peak temperature of combustion is reduced and in turn the thermally induced formation of nitric oxides is strongly reduced when compared to the combustion of the fuel mass flow in the combined first and second oxidizer mass flow in one single step, at least when referring to diffusion mode combustion. It may be said that the combustion method comprises combusting the fuel mass flow in two steps, wherein after the first step of combustion the heat from the first step of combustion is dispersed such as to reduce the peak flame temperature of combustion and in turn the thermally induced formation of nitric oxides. The flow of combustion products, comprising combustible components as well as most generally inert components, may be considered a fuel with a lower specific heating value, and accordingly a lower temperature rise upon combustion, when compared to the fuel discharged into the first oxidizer mass flow, while the heat from the first, incomplete combustion has been dispersed.

In a more specific aspect, the method may comprise discharging the flow of combustion products and the second oxidizer mass flow such as to avoid intermixing of the flow of combustion products and the second oxidizer mass flow, thus providing an interface between the second oxidizer mass flow and the flow of combustion products downstream the heat exchange appliance, and combusting the residual combustible components provided in the flow of combustion products at the interface between the second oxidizer mass flow and the flow of combustion products. That is to say, the flow of combustion products is further combusted in a diffusion combustion mode. As noted above, due to the fact that a part of the heat from the first rich, incomplete combustion stage has been transferred to the second oxidizer mass flow, the peak temperature of the diffusion flame is lower when compared to the combustion of the fuel in a diffusion flame in one single step, yielding in a significant reduction in nitric oxides formation, while the combustion is achieved with the superior stability and turndown or part load capability of a diffusion flame.

These properties make the method particularly well suitable to apply in providing a supporting piloting flame for lean premix burners at low loads without yielding a significant penalty in nitric oxides emissions.

In still a further aspect the method may comprise apportioning the fuel mass flow and the first and second oxidizer mass flows such that an overstoichiometric fuel/air ratio is achieved when relating the fuel mass flow to the first oxidizer mass flow, and an understoichiometric fuel/air ratio is achieved when relating the fuel mass flow to the combined first and second oxidizer mass flows. This measure is useful in order to achieve complete combustion, avoiding for instance carbon monoxide and unburnt hydrocarbons emissions, and further supports diluting the heat from the incomplete first combustion to a larger second oxidizer mass flow. As with an overall understoichiometric fuel/oxidizer ratio not all the second oxidizer mass flow participates in combusting the flow of combustion products, a part of the heat transferred to the second oxidizer mass flow is not present in the region where the combustible residuals from the flow of combustion products are combusted. The peak temperature of combustion is thus further reduced, with the already noted benefit as to nitric oxides formation.

It is understood that n varying the thermal load of combustion the fuel mass flow is varied. The method may on certain aspects comprise varying the first oxidizer mass flow in order to maintain the stoichiometry ratio of the first stage combustion within a predefined interval.

In certain instances the fuel/oxidizer ratio, when relating the fuel mass flow to the first oxidizer mass flow, may be larger than or equal to 1.5 and smaller than or equal to 3, and in particular may be larger than or equal to 1.8 and smaller than or equal to 2.5, and may in a specific instance at least essentially equal 2 or be about 2. As will be appreciated, this means a fairly rich combustion in the first incomplete combustion stage, and accordingly good flame stability, low to nil nitric oxides formation, and the provision of a flow of combustion products comprising a large fraction of non-combusted or incompletely combusted components.

In certain instances, the second oxidizer mass flow exceeds the first oxidizer mass flow. In more specific embodiments, the second oxidizer mass flow may reach from 4 times the first oxidizer mass flow and up to 20 times the first oxidizer mass flow. In a specific instance it may be at least approximately 10 times the first oxidizer mass flow. With the above-specified range of the "rich" stage equivalence ratio, an overall lean, understoichiometric fuel/air ratio, based upon relating the fuel mass flow to the sum of the first and second oxidizer mass flows, is achieved.

As noted above, in further instances the method may comprise controlling the first oxidizer mass flow in order to control the ratio of the fuel mass flow to the first oxidizer mass flow. In particular embodiments, one of the second oxidizer mass flow and the sum of the first and second oxidizer mass flows is not affected by said control measure. In varying the air split, or, more generally spoken, oxidizer mass flow split between the first and the second combustion stage, the ratio of the fuel mass flow to first oxidizer mass flow, or, the first combustion stage equivalence ratio, may be maintained within an envisaged window even at significantly varying fuel mass flows. The final combustion stage is quite insensitive to changes of the overall equivalence ratio, in particular when operated in diffusion combustion mode.

In further exemplary modes of performing the method as described herein it comprises adding a second fuel mass flow to the second oxidizer mass flow, thereby providing a second fuel/oxidizer flow, wherein the second fuel mass flow added upstream a downstream end of the heat exchange appliance and in particular upstream the heat exchange appliance. In this respect the method may further comprise apportioning the second fuel mass flow such as to achieve an understoichiometric fuel/oxidizer ratio for both the fuel/oxidizer ratio of the second fuel/oxidizer flow as well as for a combined fuel/oxidizer mass flow ratio of a combined fuel mass flow consisting of the fuel mass flow added to the first oxidize mass flow and the second fuel mass flow, related to a combined oxidizer mass flow consisting of the first oxidizer mass flow and the second oxidizer mass flow. It is appreciated that by virtue of said embodiment the method may be carried out over a vast load range. The first fuel mass flow is apportioned such as to provide a sufficiently stable piloting flame, whereas a considerably higher fuel mass flow may be provided as the second fuel mass flow to the second oxidizer mass flow.

In a further aspect the second fuel mass flow may be provided and admixed to the second oxidizer mass flow such as to provide a lean premixed second fuel/oxidizer flow at the downstream end of the heat exchange appliance. In this respect, the second oxidizer mass flow and the second fuel mass flow may be provided and mixed through a lean premix burner appliance as known from the art and cited above. The final combustion of the incomplete combustion products from the first, rich, combustion stage may then, in certain exemplary embodiments, serve as a supporting or piloting stage for the lean premix fuel/air mixture provided by the second fuel mass flow and the second oxidizer mass flow. It may however in other instances be that the combustion of the incomplete combustion products along with the premix combustion of a lean premixed fuel/oxidizer flow from the second fuel mass flow and the second oxidizer mass flow in combination serve as a supporting piloting flame of a lean premix burner known from the art. Generally, exchanging heat with the second oxidizer mass flow and thus providing a preheated lean fuel/oxidizer mixture may serve to further support stable combustion of the lean premixed fuel/oxidizer mixture.

In this respect a method is disclosed wherein the method lined out above is applied in supporting or piloting, said terms being used synonymously, a lean premix combustion, at least at low premix combustion loads which may otherwise fall below a minimum premix fuel/oxidizer ratio required for stable lean premix combustion. In one aspect, the flow of incomplete combustion products from the first combustion stage may be discharged from a first duct of the heat exchange appliance and be combusted with a second oxidizer mass flow or a lean premixed fuel/oxidizer which is discharged from a second duct of the heat exchange appliance. A main lean premixed flow may then be, separately and distinct from the first and second oxidizer mass flows, be provided in a manner known per se, for instance through a premix appliance as initially cited. In this respect the first and second oxidizer mass flows with the therein discharged and partially combusted fuel mass flow, or fuel mass flows, respectively, serve as a pilot combustor for a lean premix combustor which is provided with a further oxidizer and fuel mass flow. In another aspect the second oxidizer mass flow with a second fuel mass flow discharged therein serves as the main premix combustion stage, while the combustion products generated in the first, rich combustion stage are discharged into and combusted in the preheated main premix combustion mass flow and serve to provide a piloting flame.

It is noted that it may be conceivable, in this respect, to shut down the first fuel mass flow if the thermal load, and in turn the equivalence ratio, in the main premix combustion flow is sufficient to provide stable lean premix combustion without a piloting stage.

In still further exemplary embodiments the method is applied as a front stage combustion method in a Constant Pressure Sequential Combustion, that is, still additional fuel may be discharged into and combusted in the combustion products after the flow of combustion products discharged from the heat exchange appliance has been completely combusted. This is possible if the overall fuel/oxidizer mass flow ratio of the above-identified combustion process, that is the sum of the fuel mass flows discharged into the first and second oxidizer mass flows related to the sum of the first and second oxidizer mass flows, is understoichiometric such that after complete combustion of said fuels a flow of completely combusted combustion products with sufficient residual oxygen is generated. It is understood that the flow of combustion products is riot expanded before discharging the additional fuel, but the total pressure is, apart from inevitable losses due to the flow and the addition of heat, maintained constant.

Further, it is disclosed to apply the method for the combustion of fuel in a power engine, in particular in an internal combustion power engine, and more in particular in a gas turbine engine.

In still a further aspect of the present disclosure a device for combusting a fuel is disclosed which is particularly suitably to carry out a method as described above. Said device comprises means for providing a first fluid flow, fuel discharge means for discharging a fuel flow into the first fluid flow, a first combustion zone adapted and configured to stabilize a flame and being disposed downstream the fuel discharge, means and being in fluid communication with the means for providing the first fluid flow at an upstream end of the combustion zone. The device further comprises a heat exchange appliance, said heat exchange appliance comprising at least one first duct and at least one second duct, and the heat exchange appliance being provided to enable an exchange of heat between a fluid provided in the first duct and a fluid provided in the second duct. The at least one first duct of the heat exchange appliance, at an upstream end thereof, is in fluid communication with the first combustion zone at a downstream end of the combustion zone. A means is provided for providing a second fluid flow to an upstream end of the at least one second duct. A second combustion zone is provided downstream the heat exchange appliance, wherein the at least one first duct and the at least one second duct are provided in fluid communication with the second combustion zone at a downstream end of the respective duct. It is apparent that, due to this arrangement of the components, combustion products from the first combustion zone flow through the at least one first duct, thereby exchanging heat with the fluid provided in the at least one second duct. The combustion components and the fluid provided in the at least one second duct are jointly discharged into the second combustion zone after having exchanged heat, and, to the extent the combustion products from the first combustion zone are products of an incomplete combustion, still comprising combustible components, the combustion products may be finally combusted in the second combustion zone.

It is understood that the heat exchange appliance should be provided with sufficiently large heat exchange surfaces and with a pressure loss gradient as small as possible, while enabling a sufficient heat transfer. In particular a wall structure separating the first and second ducts may be a lobed or convoluted structure in order to enhance the heat exchange surface compared to the flow cross sections provided by the heat exchange appliance.

The first duct and the second duct may in certain instances, at least at a downstream end of the respective duct, be arranged with troughflow direction of the ducts parallel to each other such as to avoid intermixing of a flow of the first fluid and the flow of the second fluid upon being discharged from the ducts. Thus, the formation of an interface between the first and the second fluid is supported, which facilitates the above-mentioned diffusion combustion of combustible components which may be comprised in the flow discharged from the at least one first duct of the heat exchange appliance.

In another aspect the heat exchange appliance may comprise at least one heat pipe. Heat pipe technology is in essence known to the skilled person. In brief, a heat pipe comprises a hollow body in which, an substance is provided having a lower boiling temperature than the melting temperature of the material of the body. On the relatively hot side of the heat pipe said substance is intended to boil, the vapor is guided to the relatively cold side, condenses, and the liquid returns to the relatively hot side of the heat pipe. Heat exchange is thus fostered not only by heat conduction, but also by convection and phase change. The transport of the substance inside the body may for instance be driven by gravity, due to the differential density of the steam and liquid, capillarity and so forth. Further explanations are moot as heat pipe technology as such is well-known in the art.

The device may further comprise at least one control means for controlling at least one of a mass flow of the first fluid and/or a mass flow of the second fluid. This may serve to enable adaption of the mass flow of the first fluid a fuel mass flow in order to adjust the equivalence ratio of the combustion in the first combustion zone, and/or to adapt the mass flow ratio of the first and second fluid to meet operation requirements.

According to a further aspect, at least one second fuel discharge means provided and configured to discharge a second fuel into the second fluid flow may be provided. In more particular aspects the second fuel discharge means and the means for providing the second fluid may be provided, adapted and configured such a to provide a premixed flow of the second fluid and the second fuel at the downstream end of the heat appliance device.

Disclosed is further a combustion device comprising a lean premix burner, for instance, but not limited to, any of the types initially described, and further a device as described above provided as a piloting stage for supporting premix combustion in a manner familiar to the skilled person.

Further disclosed is a Constant Pressure Sequential Combustion appliance, in which a combustion device of the kind described above is provided as a front combustion stage and is arranged and configured to discharge the completely burnt combustion products from the second combustion zone into a duct, wherein means are provided to discharge further fuel into said duct. It is noted that in said appliance no expansion turbine stage is interposed between the combustion device and the means for discharging further fuel.

A gas turbine engine is disclosed comprising at least one combustion chamber which is equipped with a device for combusting a fuel as disclosed above. The operation of a gas turbine engine is disclosed in which at least one fuel mass flow is combusted according to an above-disclosed method.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a first exemplary embodiment of a combustion device according to the present disclosure, in which a method as disclosed above is performed.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

EXEMPLARY MODES OF CARRYING OUT THE TEACHING OF THE PRESENT DISCLOSURE

Figure 1:
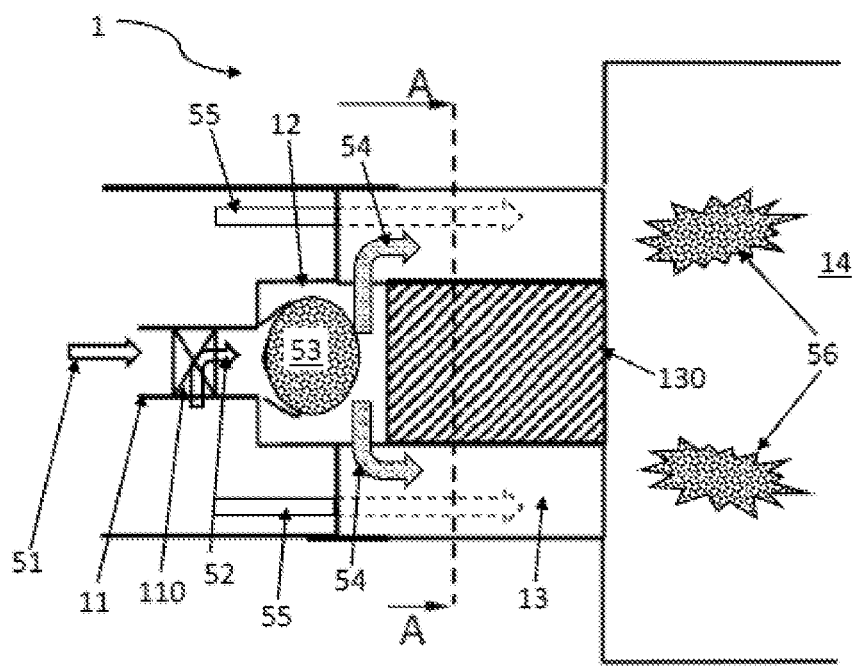
Figure 2:
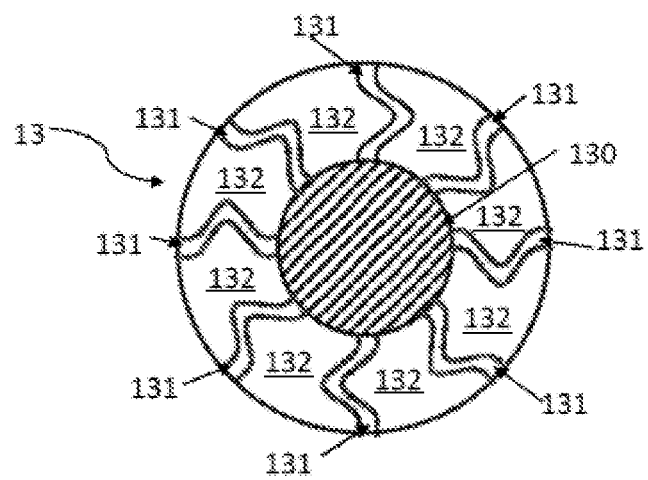
FIG. 2 a cross sectional view of the heat exchange appliance of the combustion device of FIG. 1.

FIG. 1 shows a first exemplary embodiment of a combustion device as lined out above, and illustrating an exemplary mode of performing a method as herein disclosed. Combustion device 1 comprises front burner 11 and first combustion zone 12 disposed downstream thereof. A first fluid flow, or first oxidizer mass flow 51, is provided to front burner 11 through an appropriate means. The specific implementation of said means is not relevant to the present explanations. First oxidizer mass flow 51 may for instance be a portion of a compressed air mass flow provided by a compressor in a gas turbine engine. First oxidizer mass flow 51 is guided, for instance, through swirl generating means 110. A fuel mass flow 52 is discharged into first oxidizer mass flow 51. A combined flow of first oxidizer mass flow 51 and fuel mass flow 52 enters first combustion zone 12. First combustion zone 12 is in this instance provided as a cross sectional jump. Generally, suitable means are provided to allow stabilization of a flame 53 in first combustion zone 12. Any suitable means the skilled person is familiar with may be provided. Fuel mass flow 52 is combusted in first oxidizer mass flow 51 in flame 53. Front burner 11 and first combustion zone 12 may be provided to provide flame 53 as a diffusion flame, a premix flame, or any hybrid type thereof. Fuel mass flow 52 and first oxidizer mass flow 51 are apportioned such as to provide an overstoichiometric fuel/oxidizer ratio. That is, the mass flow of oxidizing agent in first oxidizer mass flow 51, i.e. for instance the mass flow of oxygen provided in an air mass flow, is insufficient to completely burn fuel mass flow 52. Accordingly, a peak combustion temperature in flame 53 is significantly lower than a stoichiometric combustion temperature. Thus, and due to the lack of oxidizing agent, the thermally induced formation of pollutants, such for instance thermally induced nitric oxides formation, is significantly reduced when compared to a combustion under stoichiometric conditions, or even in a combustion with a surplus of oxidizing agent. The reasons are, as will be readily appreciated, the lower temperatures for initiating thermally induced nitrogen oxidation, arid the lack of oxidizing agent available for the formation of nitric oxides. Combustion products 54 from the combustion of fuel mass flow 52 in first oxidizer mass flow 51 thus comprise residual combustible components, such as, in the case of the combustion of hydrocarbons, unburnt or incompletely burnt hydrocarbons and carbon monoxide, and/or other residual combustibles. Downstream of first combustion zone 12 heat exchange appliance 13 is provided. As is illustrated in connection with FIG. 2, showing a cross section along A-A in FIG. 1, heat exchange appliance 13 in the present example comprises a core 130, first ducts 131 of the heat exchange appliance, and second ducts 132 of the heat exchange appliance. Walls separating first ducts 131 and second ducts 132 are convoluted or lobed to enlarge the heat exchange surface between fluids provided in first and second ducts. As is known to the skilled person, the walls may further comprise structures to further enhance heat transfer. Ducts 131, 132 may extend spirally or otherwise wound around core 130. First combustion zone 12 is in fluid communication with first ducts 131 at an upstream end of the heat exchange appliance and receives the flow of combustion products 54 from first combustion zone 12. A second oxidizer mass flow 55 is provided to second ducts 132 of heat exchange appliance 13 at an upstream end thereof. First and second oxidizer mass flows 51, 55 may be mass flows of a common oxidizer mass flow, such as for instance a compressed air mass flow provided by a compressor of a gas turbine engine. Second oxidizer mass flow 55 will generally be larger than first oxidizer mass flow 51. A combined fuel/oxidizer mass flow in combustion device 1 may be understoichiometric, that is, provide an oxidizing agent surplus, as will be lined out below. Second oxidizer mass flow 55 and the flow of combustion products 54 flow through the respective ducts in heat exchange appliance 13 in a heat exchange relationship. Generally, due to the combustion in first combustion stage 12, the temperature of combustion products 54 may be assumed to be higher than the temperature of the second oxidizer mass flow 55. Accordingly, the flow of combustion products 54 will cool down and the second oxidizer mass flow 55 will heat up in heat exchange appliance 13. At a downstream end of heat exchange appliance 13 the heated second oxidizer mass flow and the cooled flow of combustion products are discharged from the ducts of the heat exchange appliance at a downstream end of the heat exchange appliance, and into a second combustion zone 14 disposed at a downstream end of heat exchange appliance 13. The flow of combustion products 54 and the second oxidizer mass flow 55 are discharged at least essentially without crosswise, mutually penetrating, velocity components, or at least largely parallel to each other. Thus, rapid large scale intermixing of the flows is avoided. The discharged flows form the heat exchange appliance form an interface layer between them. The residual combustible components comprised in the flow of combustion products 54 are combusted with oxidizing agent from the second oxidizer mass flow at the flow interfaces between the discharged cooled combustion products and the discharged heated second oxidizer mass flow in flames 56. Flames 56 are essentially located downstream first ducts 131. Said combustion, due to the lack of intermixing between the fluids discharged from heat exchange appliance 13, takes place in a diffusion combustion mode, providing for a superior combustion stability even at overall lean, strongly understoichiometric conditions. Due to the surplus of oxidizer provided in the second oxidizer mass flow not ail the oxidizer provided in the second oxidizer mass flow will participate in the combustion process in flames 56. In fact, as will be lined out below, only a minor fraction of the second oxidizer mass flow will participate in the combustion in flames 56. The heat from the combustion in first combustion zone 12 has however been dispersed from the flow of combustion products to the sum of the mass flow of combustion products plus the second oxidizer mass flow. Thus, part of the heat from the combustion in first combustion zone 12 is provided in fluid which does not participate in the combustion in flames 56. In turn, not all the heat form the combustion of fuel mass flow 52 is present in the combustion in flames 56 in the second combustion zone 14. In turn, although flames 56 are diffusion flames, thus locally combusting at stoichiometric conditions, the peak temperature in flames 56 is reduced when compared to the combustion of fuel mass flow 52 in a diffusion combustion mode in one single step. Consequently, the combined thermally induced formation of nitric oxides in flames 53 and 56, or in first and second combustion zones 12 and 14, respectively, is significantly reduced when compared to a diffusion combustion in one single stage, while still providing the superior combustion stability and part load operation behavior of a diffusion flame.

Second oxidizer mass flow 55 may be typically 4 to 20 times the first oxidizer mass flow, and in more specific instances at least approximately 10 times the first oxidizer mass flow. The equivalence ratio of the fuel mass flow related to the first oxidizer mass flow may be larger than or equal to 1.5 and smaller than or equal to 3, and in particular may be larger than or equal to 1.8 and smaller than or equal to 2.5, and may in a specific instance be at least approximately 2, or about 2. In order to maintain the equivalence ratio in first combustion stage 12 in said range over a large load range of the combustion device, that is a large range of fuel mass flow 52, it is conceivable to control first oxidizer mass flow 51. The overall equivalence ratio, resulting when relating fuel mass flow 52 to the sum of the first and second oxidizer mass flow, may consequently be 0.5 or less, and, depending on the state of operation, 0.25 or less. Consequently, at least 50% of second oxidizer mass flow 55 will not participate in the combustion, and consequently a significant share of the heat released form combustion and transferred to second oxidizer mass flow 55 in heat exchange appliance 13 is not present in the flame, resulting in the lower peak flame temperature mentioned above. It may be said that the diffusion flames downstream of heat exchange appliance 13 are cooled in transferring heat released in first combustion zone 12 to second oxidizer mass flow 55 in heat exchange appliance 13.

Figure 3:
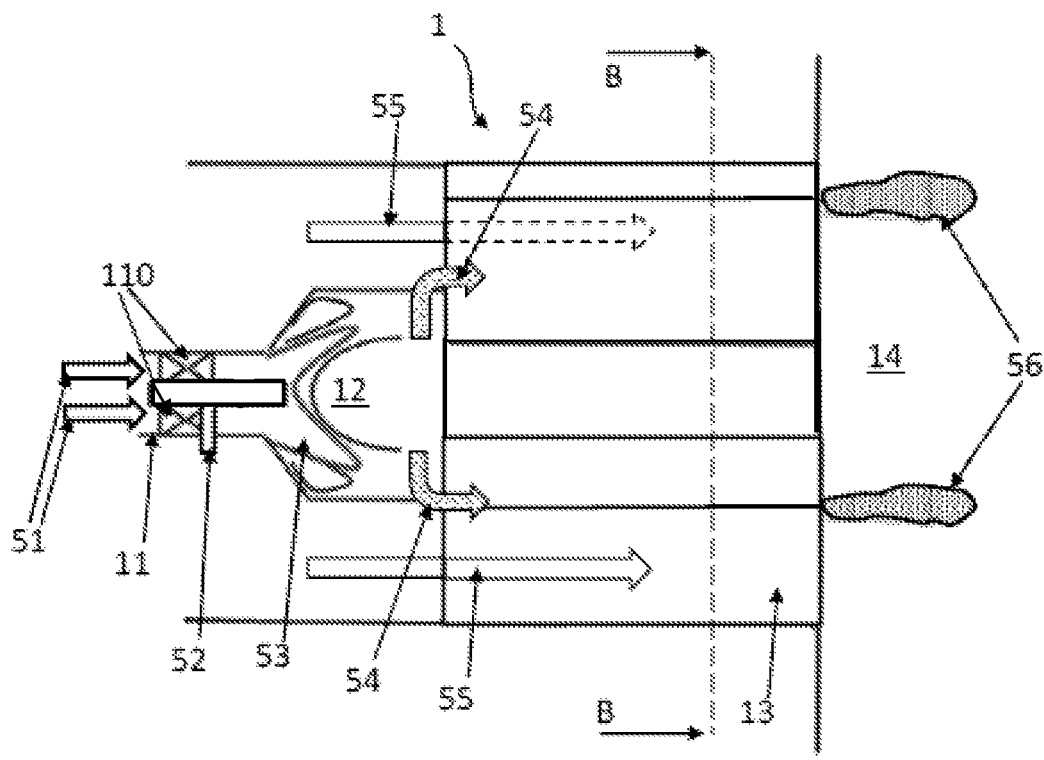
FIG. 3 a second exemplary embodiment of a combustion device according to the present disclosure, in which a method as disclosed above is performed.
Figure 4:
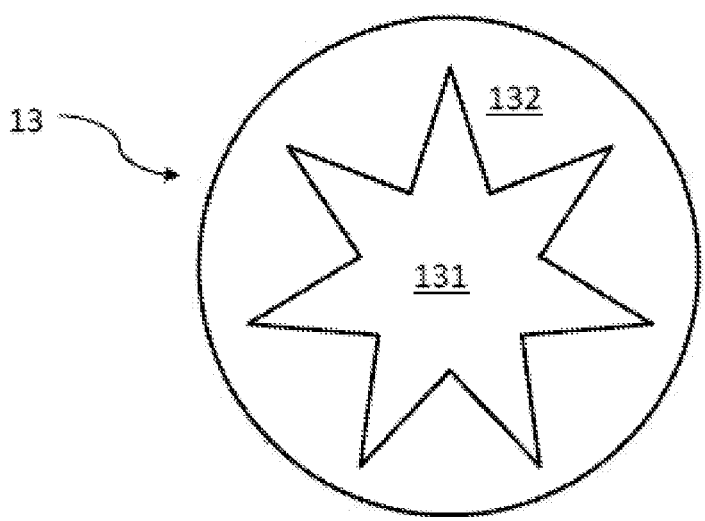
FIG. 4 a cross sectional view of the heat exchange appliance of the combustion device of FIG. 3, and FIG. 5 a third exemplary embodiment of a combustion device according to the present disclosure comprising heat pipes, in which a method as disclosed above is performed.

A further embodiment of a combustion device according to the present disclosure, and suitable for carrying out the method as disclosed above, is illustrated in connection with FIGS. 3 and 4. In substance, the combustion device differs from the one lined out in connection with FIGS. 1 and 2 in a different embodiment of heat exchange appliance 13. FIG. 4, which is a section along B-B of FIG. 3, illustrates a heat exchange appliance 13 which is provided with a first, inner duct 131 and a second, outer duct 132. The flow of combustion products 54 from first combustion zone is provided through inner duct 131, and flows through first, inner duct 131 in a heat exchange relationship with a second oxidizer mass flow 65 which is provided through second, outer duct 132. As in the example provided above, the walls separating first duct 131 from second duct 132 are convoluted or lobed to enhance the heat exchange surface. First duct 131 exhibits a generally star-shaped cross section. Again, further elements further enhancing heat transfer between the walls and a fluid flowing along the wall may be provided in a manner known to the skilled person. Also, as in the example provided above, a fuel mass flow 52 and a first oxidizer mass flow are apportioned such as to provide a rich, overstoichiometric combustion in first combustion zone 12. Combustion products 54 thus comprise, as in the example provided above, residual combustibles. While flowing through heat exchange appliance 13, the flow of combustion products 54 is cooled down, while the second oxidizer mass flow 55 is heated. When heated second oxidizer mass flow 55 and combustion products 54 are discharged into second combustion zone 14 at a downstream end of heat exchange appliance 13, again rapid intermixing of the flows is avoided. The combustible residuals comprised in the flow of combustion products 54 are combusted in a diffusion flame 56 at an interface between the discharged combustion products and the discharged second oxidizer mass flow. It will be appreciated that a single generally star-shaped diffusion flame 56 will result in second combustion zone 56. It may be assumed that the heat exchange appliance shown in the embodiment of FIGS. 3 and 4 yields a lower total pressure loss when compared to that of the embodiment of FIGS. 1 and 2. However, the heat exchange surface per unit length of heat exchange appliance 13 is smaller when compared to the embodiment of FIGS. 1 and 2. Moreover, the fluid interface between the discharged flow of combustion products and the discharged second oxidizer mass flow in second combustion zone 14 may be smaller at a comparable flow cross section. Hence, a larger distance may be required in second combustion zone 14 to provide a complete burn-out of the combustible residuals comprised in the flow of combustion products. These facts need to be considered when designing the combustion device.

Figure 5:
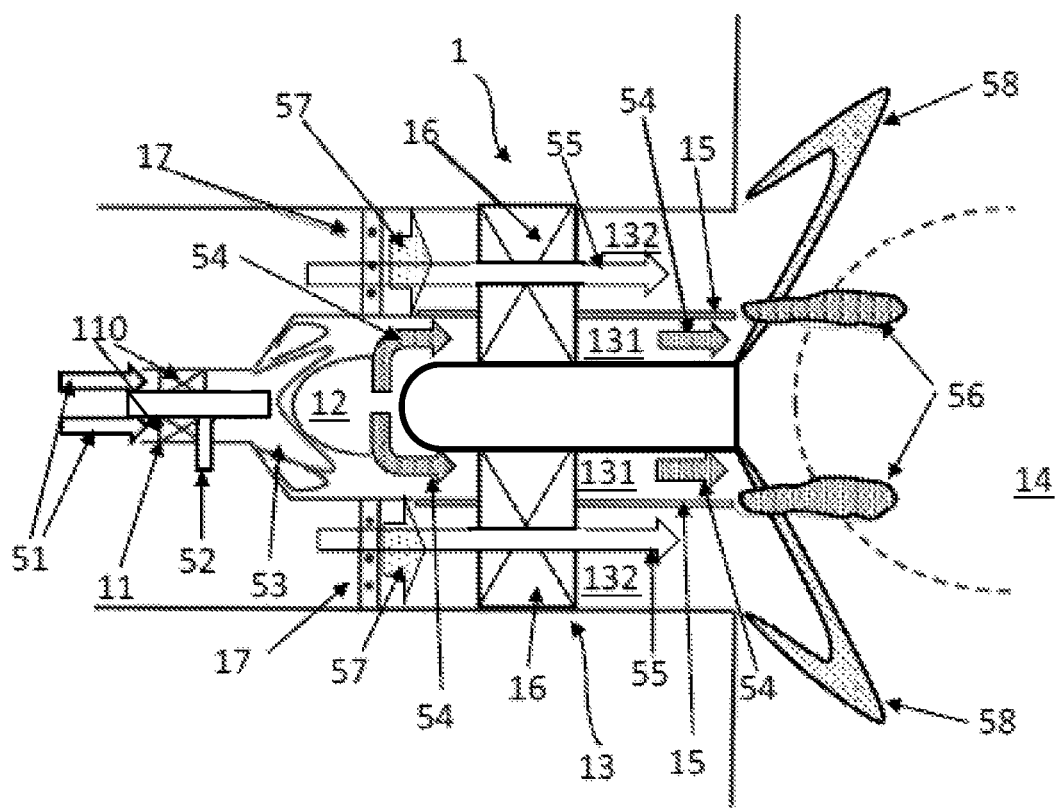

In a further embodiment shown in connection with FIG. 5 a further embodiment of a heat exchange appliance is shown. A first duct 131 of heat exchange appliance 13, to which the flow of combustion products 54 from first combustion zone 12 is provided, and a second duct 132 of heat exchange appliance 13, to which the second oxidizer mass flow is provided, are separated by a wall 15. Second duct 132 may in particular be provided as an annular duct. Heat exchange, however, is not primarily effected by heat conduction through wall 15, but makes use of heat pipe technology, which is generally known to the skilled person. Heat pipes 16 are provided extending from within first duct 131 to within second duct 132, thus enabling the transfer of heat from the flow of combustion products to the second oxidizer mass flow. Second fuel discharge devices 17 are provided in the second oxidizer mass flow and are provided to discharge a second fuel mass flow 57 into second oxidizer mass flow 55. Second fuel discharge devices 17 are arranged and configured to disperse second fuel 57 as finely and uniform into second oxidizer mass flow 55 as possible. At least the sections of heat pipes 16 which extend within second duct 132 are provided as a swirler and/or vortex generating device, such that the second fuel mass flow 57 becomes uniformly admixed with second oxidizer mass flow 55, and a vortex flow is generated in second duct 132. At the transition location from heat exchange appliance 13 to second combustion zone 14 a cross sectional jump is provided. The vortex flow emanating from second duct 132 bursts open and provides a flame stabilization region. Further, as in the examples provided above, a diffusion flame 56, combusting the residuals combustibles in the flow of combustion products 54, is formed at a fluid interface between the second oxidizer mass flow and the flow of combustion products. Second fuel mass flow 57, which is provided in a premixed vortex flow with second oxidizer mass flow 55, is combusted in a premix flame 58 which is induced by the vortex breakdown upon discharge of the premix vortex flow from heat exchange appliance 13, or second duct 132 thereof, respectively, and into second combustion zone 14, and further due to the cross sectional jump at the transition from heat exchange appliance 13 to second combustion zone 14. Premix flame 58 is supported and stabilized, in particular at low equivalence ratios of the premixed fuel/oxidizer mixture, by diffusion flame 56.

It will be appreciated that the combustion devices as lined out in connection with FIGS. 1 through 4 may, in the manner of the device of FIG. 5, be equipped with fuel discharge devices provided for discharging a fuel into the second oxidizer mass flow, and may accordingly be operated with a premix flame in the second combustion zone from a premixed fuel/oxidizer flow from the second oxidizer mass flow and a second fuel mass flow discharged therein, and further with a diffusion flame wherein combustible residuals in the combustion products from the first combustion zone are combusted with oxidizing agent from the second oxidizer mass flow. Any combustion device of the type herein disclosed, and the lined out combustion method, may be used as a piloting stage for a premix burner, for instance, but not limited to, a premix burner of the type initially mentioned. It will be readily appreciated that in one instance the combustion process, or the combustion device, respectively, including, in case a second fuel mass flow is discharged into the second oxidizer mass flow, the premix flame therefrom, may serve as the piloting stage supporting the premix combustion of the premix burner, at least at low premix burner fuel/oxidizer mass flow ratios. In other instances, the second oxidizer mass flow may be provided as the oxidizer mass flow of a main premix burner, and the diffusion flame combusting the combustible residuals from the first combustion stage may serve as the supporting piloting stage. As will further be readily appreciated, the method and combustion device herein disclosed allow for providing a supporting piloting operation of a premix burner with significantly lower nitric oxides emissions penalties when compared to a piloting diffusion combustion of a piloting fuel mass flow in one single stage.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

LIST OF REFERENCE NUMERALS 1 combustion device
11 front burner
12 first combustion zone
13 heat exchange appliance
14 second combustion zone
15 wall
16 heat pipe
17 second fuel discharge device
51 first fluid flow, first oxidizer mass flow
52 fuel mass flow
53 flame
54 combustion products, flow of combustion products
55 second oxidizer mass flow
56 flame, diffusion flame
57 second fuel, second fuel mass flow
58 flame, premix flame
110 swirl generating means
130 core of heat exchange appliance
131 first duct of heat exchange appliance
132 second duct of heat exchange appliance

The invention claimed is:

1. A method for combusting a fuel, the method comprising:
providing a first oxidizer mass flow;
providing a second oxidizer mass flow;
discharging a fuel mass flow into the first oxidizer mass flow thereby providing a fuel/oxidizer mass flow;
apportioning the fuel mass flow such as to achieve an overstoichiometric ratio of the fuel mass flow related to the first oxidizer mass flow;
initiating a combustion of the fuel mass flow with the first oxidizer mass flow, thereby generating a flow of combustion products, wherein the flow of combustion products includes residual combustible components;
providing the flow of combustion products to at least one first duct of a heat exchange appliance;
providing the second oxidizer mass flow to at least one second duct of the heat exchange appliance, whereby the flow of combustion products is provided in a heat exchange relationship with the second oxidizer mass flow through the heat exchange appliance
exchanging heat between the flow of combustion products and the second oxidizer mass flow, thereby heating the second oxidizer mass flow and cooling the flow of combustion products;
discharging the flow of combustion products from the at least one first duct of the heat exchange appliance at a downstream end of the heat exchange appliance;
discharging the second oxidizer mass flow from the second duct of the heat exchange appliance at a downstream end of the heat exchange appliance;
combusting the residual combustible components provided in the flow of combustion products in a presence of the second oxidizer mass flow;
discharging the flow of combustion products and the second oxidizer mass flow such as to avoid intermixing of the flow of combustion products and the second oxidizer mass flow, thus providing an interface between the second oxidizer mass flow and the flow of combustion products downstream of the heat exchange appliance; and
combusting the residual combustible components provided in the flow of combustion products at the interface between the second oxidizer mass flow and the flow of combustion products.

2. The method according to claim 1, comprising:
apportioning the fuel mass flow and the first and second oxidizer mass flows such that an overstoichiometric fuel/air ratio is achieved when relating the fuel mass flow to the first oxidizer mass flow, and an understoichiometric fuel/air ratio is achieved when relating the fuel mass flow to the combined first and second oxidizer mass flows.

3. A method for combusting a fuel, the method comprising:
providing a first oxidizer mass flow;
providing a second oxidizer mass flow;
discharging a fuel mass flow into the first oxidizer mass flow thereby providing a fuel/oxidizer mass flow;
apportioning the fuel mass flow such as to achieve an overstoichiometric ratio of the fuel mass flow related to the first oxidizer mass flow;
initiating a combustion of the fuel mass flow with the first oxidizer mass flow, thereby generating a flow of combustion products, wherein the flow of combustion products includes residual combustible components;
providing the flow of combustion products to at least one first duct of a heat exchange appliance;
providing the second oxidizer mass flow to at least one second duct of the heat exchange appliance, whereby the flow of combustion products is provided in a heat exchange relationship with the second oxidizer mass flow through the heat exchange appliance;
exchanging heat between the flow of combustion products and the second oxidizer mass flow, thereby heating the second oxidizer mass flow and cooling the flow of combustion products;
discharging the flow of combustion products from the at least one first duct of the heat exchange appliance at a downstream end of the heat exchange appliance;
discharging the second oxidizer mass flow from the second duct of the heat exchange appliance at a downstream end of the heat exchange appliance;
combusting the residual combustible components provided in the flow of combustion products in a presence of the second oxidizer mass flow; and
wherein the second oxidizer mass flow exceeds the first oxidizer mass flow.

4. The method according to claim 3, comprising:
controlling the first oxidizer mass flow in order to control a ratio of the fuel mass flow to the first oxidizer mass flow.

5. The method according to claim 3, comprising:
adding a second fuel mass flow to the second oxidizer mass flow, thereby providing a second fuel/oxidizer flow, wherein the second fuel mass flow is added upstream a downstream end of the heat exchange appliance or upstream the heat exchange appliance.

6. The method according to claim 5, comprising:
apportioning the second fuel mass flow such as to achieve an understoichiometric fuel/oxidizer ratio for both the fuel/oxidizer ratio of the second fuel/oxidizer flow as well as for a combined fuel/oxidizer mass flow ratio of a combined fuel mass flow which includes the fuel mass flow added to the first oxidizer mass flow and the second fuel mass flow, related to a combined oxidizer mass flow including the first oxidizer mass flow and the second oxidizer mass flow.

7. The method according to claim 5, comprising:
performing an addition of the second fuel mass flow such as to provide a lean premixed second fuel/oxidizer flow at the downstream end of the heat exchange appliance.

8. The method of claim 3, wherein the second oxidizer mass flow is 4 to 20 times the first oxidizer mass flow.

9. The method of claim 3, wherein the second oxidizer mass flow is at least 10 times the first oxidizer mass flow.

10. The method of claim 3, wherein an equivalence ratio of the fuel mass flow to the first oxidizer mass flow is between 1.5 and 3.

11. The method of claim 3, comprising:
discharging the flow of combustion products and the second oxidizer mass flow such as to avoid intermixing of the flow of combustion products and the second oxidizer mass flow, thus providing an interface between the second oxidizer mass flow and the flow of combustion products downstream the heat exchange appliance; and
combusting the residual combustible components provided in the flow of combustion products at the interface between the second oxidizer mass flow and the flow of combustion products.

12. The method of claim 3, comprising:
apportioning the fuel mass flow and the first and second oxidizer mass flows such that an overstoichiometric fuel/air ratio is achieved when relating the fuel mass flow to the first oxidizer mass flow, and an understoichiometric fuel/air ratio is achieved when relating the fuel mass flow to the combined first and second oxidizer mass flows.

13. A combustion device for combusting a fuel, the combustion device comprising:
means for providing a first fluid flow;
fuel discharge means for discharging a fuel flow into the first fluid flow;
a first combustion zone adapted and configured to stabilize a flame and being disposed downstream the fuel discharge means and being in fluid communication with the means for providing the first fluid flow at an upstream end of the first combustion zone;
a heat exchange appliance, said heat exchange compliance having at least one first duct and at least one second duct and the heat exchange appliance being configured to enable an exchange of heat between a fluid provided in the at least one first duct that comprises combustion products having residual combustible components and a fluid provided in the at least one second duct, the at least one first duct of the heat exchange appliance, at an upstream end thereof being in fluid communication with the first combustion zone at a downstream end of the combustion zone;
a means for providing a second fluid flow to an upstream end of the at least one second duct of the heat exchange appliance; and
a second combustion zone being provided downstream the heat exchange appliance, wherein the at least one first duct and the at least one second duct are provided in fluid communication with the second combustion zone at a downstream end of the respective duct;
the second combustion zone configured so that a flow of the combustion products and the second fluid flow are discharged so as to avoid intermixing of the flow of combustion products and the second fluid flow to provide an interface between the second fluid flow and the flow of combustion products downstream of the heat exchange appliance to combust the residual combustible components at the interface between the second fluid flow and the flow of combustion products.

14. The combustion device according to claim 13, wherein the at least one first duct and the at least one second duct are at least at a downstream end of the respective duct arranged parallel to each other such as to avoid intermixing of a flow of the fluid provided in the at least one first duct and the flow of the fluid provided in the at least one second duct upon being discharged from the ducts.

15. The combustion device according to claim 13, wherein the heat exchange appliance comprises:
a heat pipe.

16. The combustion device according to claim 13, comprising:
at least one control means for controlling at least one of a mass flow of the fluid provided in the at least one first duct and/or a mass flow of the fluid provided in the at least one second duct.

17. The combustion device according to claim 13, comprising:
at least one second fuel discharge means provided and configured to discharge a second fuel into the fluid provided in the at least one second duct.

18. The combustion device according to claim 17, wherein the at least one second fuel discharge means and the means for providing the second fluid flow are provided, adapted and configured to provide a premixed flow of the fluid provided in the at least one second duct and the second fuel at the downstream end of the heat appliance device.

19. A gas turbine engine comprising:
gas turbine; and
at least one combustion chamber having a combustion device according to claim 13.

* * * * *